United States Patent [19]

Tan

[11] Patent Number: 5,863,658
[45] Date of Patent: Jan. 26, 1999

[54] CONDUCTIVE COMPOSITES DERIVED FROM POYANILINE AND AROMATIC BENZAZOLE RIGID-ROD POLYMERS

[75] Inventor: Loon-Seng Tan, Centerville, Ohio

[73] Assignee: The United States of America as represented by the Secretary of the Air Force, Washington, D.C.

[21] Appl. No.: 40,183

[22] Filed: Feb. 17, 1998

[51] Int. Cl.[6] .......................... B32B 27/00; C08F 283/00
[52] U.S. Cl. ..................... 428/423.1; 528/492; 528/501; 525/540; 525/535; 524/155; 524/157; 524/167
[58] Field of Search ................................. 528/492, 501; 525/540, 535; 524/155, 157, 167; 428/423.1

[56] References Cited

U.S. PATENT DOCUMENTS

| | | | |
|---|---|---|---|
| 4,798,685 | 1/1989 | Yaniger | 252/500 |
| 4,940,517 | 7/1990 | Wei | 204/78 |
| 5,585,040 | 12/1996 | Kirmanen et al. | 252/518 |
| 5,670,607 | 9/1997 | Chen | 528/290 |

OTHER PUBLICATIONS

Tan, L–S, Simko, S.R., Bai, S.J., Vaia, R.A., and Spry, R.J., "Conducting Composites Derived From Polyaniline and Benzobisthiazole Rigid Rod Polymer", Polymer Preprints, vol. 38, No. 1, Apr. 1997, pp. 239–240, published Mar. 10, 1997.

*Primary Examiner*—Samuel A. Acquah
*Attorney, Agent, or Firm*—Charles E. Bricker; Thomas L. Kundert

[57] ABSTRACT

A conductive composite composition consisting essentially of about 10 to 90 parts of the conducting form of polyaniline, balance an aromatic benzobisthiazole, benzobisoxazole or benzobisimidazole rigid-rod polymer, and a process for making a conductive benzobisazole polymer film.

6 Claims, No Drawings

CONDUCTIVE COMPOSITES DERIVED FROM POYANILINE AND AROMATIC BENZAZOLE RIGID-ROD POLYMERS

RIGHTS OF THE GOVERNMENT

The invention described herein may be manufactured and used by or for the Government of the United States for all governmental purposes without the payment of any royalty.

BACKGROUND OF THE INVENTION

This invention relates to conductive composite compositions of the conducting form of polyaniline and benzobisazole polymers and co-polymers.

In the field of conducting polymers, great strides have been made in the development of polyaniline (PANI)-based materials for a broad spectrum of applications ranging from electronic and optoelectronic devices to anti-corrosion coatings to gas separation membranes. PANI exists in primarily four oxidation states: the completely reduced form, leucoemeraldine base (LEB):

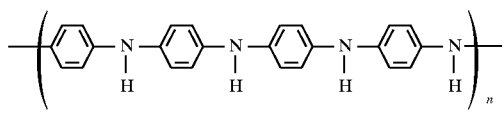

the intermediate form, emeraldine base (EB):

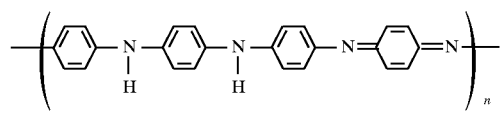

the fully oxidized form, pernigraniline base (PNB):

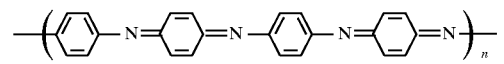

and the protonated state of the intermediate form, emeraldine salt (ES):

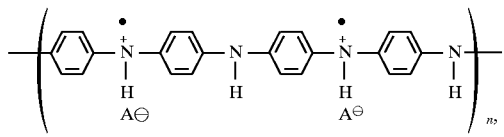

where A is a counterion, e.g., Cl$^-$, HSO$_4^-$, etc. Only the emeraldine salt (ES) is conducting. The ES form can be converted from LEB by oxidation and protonation, from PNB by reduction and protonation and from EB by simply protonation; these processes are chemically and electrochemically reversible.

Because of its good solubility in aprotic solvents such as N-methylpyrrolidinone (NMP), PANI as the emeraldine base (EB) is commonly used to prepare films. However, in this state, PANI is an insulator and a doping step is thus required in the fabrication process. Upon doping with protonic acid, the resultant emaraldine salt (ES) becomes conducting with typical conductivity values of $10^0$ to $10^2$ S/cm, depending on synthesis and processing conditions.

A major breakthrough was the discovery that the use of organic sulfonic acids, such as camphor sulfonic acid (CSA) and p-dodecylbenzenesulfonic acid (DBSA), as the protonic dopants not only provided high conductivity, but also provided solubility of PANI in its conducting state (emeraldine salt, ES) in organic solvents such as m-cresol, chloroform, hexafluoroisopropanol, and the like. This has provided a means for preparing conducting blends with controllable conductivity and thermo-mechanical properties from conducting PANI-ES and a wide range of thermoplastics and elastomers.

Unfortunately, this simple blending using non-acidic, organic solvents is not applicable to aromatic heterocyclic rigid-rod polymers such as poly(benzobisazoles) (PBX), whose solubility is limited to strong acids such as methanesulfonic acid (MSA) and poly(phosphoric acid) (PPA) and Lewis acid/nitroalkanes. These polymers have repeating units of the general formula —(—Z—Ar—)—, wherein Z is a benzobisazole group and Ar is a para-oriented aromatic moiety, such as 1,4-phenylene, 4,4'-biphenylene, 4,4'-diphenylsulfide, 4,4'-diphenylether or the like. Thus, the group includes poly(p-phenylene benzobisoxazole) (PBO), poly(p-phenylene benzibisthiazole) (PBT) and poly(p-phenylene benzobisimidazole) (PBI) polymers and co-polymers, as well as substituted derivatives thereof. The simpler PBX polymers have repeating units of the formula

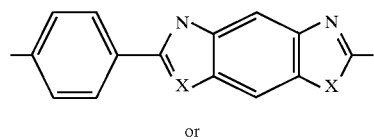

or

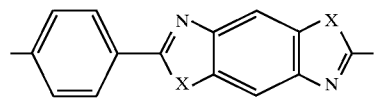

wherein X is —O—, —S— or —NH—.

The preparation and processing of rigid-rod polymers and co-polymers is well known in the art. They are commonly prepared by the condensation of at least one di- or tetraamino monomer with at least one para-oriented dicarboxylic acid monomer in a strong acid such as polyphosphoric acid (PPA). The polymer or co-polymer is commonly recovered from the reaction mixture by precipitation in water. In this context, the term 'coagulation' is often used interchangeably with 'precipitation'. The polymer or co-polymer can be formed into desirable shapes by directly extruding the PPA mixture into water. Alternatively, the polymer or co-polymer can be coagulated or precipitated into water, washed, dried and then taken up in a strong acid, such as sulfuric acid or methanesulfonic acid (MSA), then extruded, cast or spincast into desirable shapes followed by coagulation in water.

Rigid-rod polymers and co-polymers generally have very high thermal stability, high mechanical strength and low solubility in ordinary solvents. These polymers and co-polymers generally have melting temperatures higher than their thermal degradation temperatures; thus, they cannot be processed by melt-processing techniques. As noted previously, they are normally processed into desirable shapes by extrusion, casting or spin-casting from a strong acid solution, such as from a methanesulfonic acid or polyphosphoric acid solution.

Accordingly, it is an object of the present invention to provide new conductive composite compositions comprising the conducting form of polyaniline and aromatic benzobisthiazole, benzobisoxazole and benzobisimidazole (PBX) rigid-rod polymer.

It is another object to provide a process for making such conducting films.

Other objects and advantages of the present invention will be apparent to those skilled in the art.

SUMMARY OF THE INVENTION

In accordance with the present invention there is provided a conductive composite composition consisting essentially of about 10 to 90 parts of the conducting form of polyaniline, balance an aromatic benzobisthiazole, benzobisoxazole or benzobisimidazole rigid-rod polymer.

Also provided is a process for making a conductive benzobisazole polymer film.

DESCRIPTION OF THE INVENTION

The composite films of the present invention can be prepared by first preparing a stock solution (w/w) of PBX in MSA. Generally, the stock solution can contain about 0.1 to 5 weight percent PBX in MSA, preferably about 2.0 weight percent. The required amount of PANI is separately dissolved in MSA. To the resulting PANI/MSA solution is added the required amount (by weight) of PBX/MSA stock solution to make a final solution; because of the difficulty in stirring the solution(s), the preferred concentration is about 2.0 weight percent. This solution is stirred mechanically for about 12 hours to 48 hours under an inert atmosphere, such as nitrogen.

A film is prepared from the PANI/MSA/PBX solution by any method known in the art, such as by casting, spin casting, doctor blading or the like. The MSA can be removed from the film by vacuum sublimation. The resulting film is washed to remove residual MSA, then dried.

Wang, C.-S, Lee, J.-W. and Husband, M. D., in U.S. patent application Ser. No. 08/759,819, filed Nov. 18, 1996, disclose a method for preparing optical quality thin polymer films, including rigid-rod benzobisazole polymers and co-polymers, which comprises the steps of: (a) preparing a solution of the organic polymer or co-polymer, or the blend, in a suitable solvent; (b) forming a film from the solution; (c) rapidly cooling the thus-formed film to a temperature below the freezing point of the solvent; (d) dissolving the frozen solvent out of the film at a temperature below the melting point of the solvent; and (e) drying the film. The method of Wang et al may be employed to prepare thin films according to the present invention.

The method of the present invention can be employed to prepare films for structural components which must exhibit multi-functional performance characteristics. Because of their thermal stability, mechanical strength and chemical resistance, films prepared according to the present invention can also be used as filters and separation membranes.

The following examples illustrate the invention:

EXAMPLE I

Preparation of polyaniline

Freshly distilled aniline was added to a 4-necked, 1-liter round-bottomed flask equipped with a mechanical stirrer, thermometer/adaptor, glass-stopper and a pressure-equalizing addition funnel. The reaction vessel was immersed in an ice bath at 0° C. A solution of methanesulfonic acid (80g) in 500 mL of distilled water was added to the reaction vessel. To the resultant clear solution was added a solution of ammonium persulfate (46.8 g) in 100 mL of distilled water via the pressure-equalizing addition funnel. Addition was conducted in dropwise fashion so as to maintain the reaction temperature no higher than 3° C. At the beginning of addition process, the reaction mixture was clear and dark blue. Then, dark precipitates were visible and followed by the formation of dark blue film on the wall of the reaction vessel. The addition process was completed in about 4 hours. The final dark blue, heterogeneous reaction mixture was stirred at 0° C. for another 4 hours. While the reaction was still at 0° C., it was filtered through a 600 mL, medium-porosity fritted filter funnel. The black powder collected was washed with 1600 mL of cold distilled water, followed by aqueous methanesulfonic acid (50 g. in 1000 mL of distilled water). The product was suction-dried overnight. The resultant cake was stirred in 800 mL of distilled water for an hour and filtered. The filtrate was yellow. The product was then washed with 800 mL of distilled water (very faint green filtrate), 1600 mL of methanol (clear, green filtrate) and finally 2×300 mL of diethyl ether (colorless, clear filtrate). The final dark blue powder was dried in vacuum at room temperature for three days. Yield: 21.2 g. Intrinsic viscosity in methanesulfonic acid at 30° C. was 2.30 dL/g. Electrical conductivity in pellet form was $1.7 \times 10^{-1}$ S/cm.

EXAMPLE II

Preparation of polyaniline cast film

A 2 wt % polyaniline solution was prepared by mechanically stirred a mixture of 0.40 g. of polyaniline (Example I) and 20 g. of distilled methanesulfonic acid for 24 h. The resultant solution was filtered. Practically no residue was left on the filter funnel., indicating a homogeneous solution. About 10 mL of the filtered polyaniline/MSA solution was transferred to a casting dish (45 mm diameter), which was subsequently placed in a large sublimator with a flat bottom and a cone-shaped cold "finger". The sublimator was then heated with an oil bath at 65° C. under reduced pressure (0.01–0.10 torr). The set-up was such that when methanesulfonic acid vapor hit the cold surface of the cold finger, the resultant liquid MSA flowed along the cone surface and dropped outside the petri dish. After 4 days, the petri dish was removed and methanol was added to detach the polymer film. Subsequently, it was soaked in MeOH for 3 h. Finally, the cast film was dried on a coarse fritted filter funnel under a nitrogen flow. The film was pressed down with a petri dish cover, on top of which was placed a weight so as to prevent the up-curling of the film upon drying. The cast film has a conductivity value of 154 S/cm.

Following the same experimental procedure, a cast film of a commercial polyaniline (Polyscience, Inc) was prepared and had a conductivity value of 128 S/cm.

EXAMPLE III

Preparation of poly(p-phenylene benzobisthiazole) cast film

A 2 wt % poly(p-phenylene benzobisthiazole)/methanesulfonic acid (w/w) solution was prepared from mechanically mixing 1.00 g. of the polymer and 50 g. of distilled methanesulfonic acid under nitrogen for 24 h. About 10 mL of the filtered polyaniline/MSA solution was transferred to a casting dish (45 mm diameter), which was subsequently placed in a large sublimator with a flat bottom and a cone-shaped cold "finger". The sublimator was then heated with an oil bath at 65° C. under reduced pressure (0.01–0.10 torr). The set-up was such that when methanesulfonic acid vapor hit the cold surface of the cold finger, the resultant liquid MSA flowed along the cone surface and dropped outside the petri dish. After 4 days, the petri dish was removed and methanol was added to detach the polymer film. Subsequently, it was soaked in MeOH for 3 h. Finally, the cast film was dried on a coarse fritted filter funnel under a nitrogen flow. The film was pressed down with a petri dish cover, on top of which was placed a weight so as to prevent the up-curling of the film upon drying. The cast film has a conductivity value of $\leq 10^{-12}$ S/cm.

EXAMPLE IV

Preparation of Polyaniline/PBZT composite films

The preparation of the 50:50 polyaniline/PBZT composite film as described below illustrates the general procedure in the preparation of the remaining compositions: Polyaniline (0.5 g., commercial sample, [η]=0.32 g/dL in $H_2SO_4$ at 30° C.) was dissolved in methanesulfonic acid (25 g) in an Erlenmeyer flask to form a 2 wt. %, blue solution. ~10 g. of 2% (w/w) PBZT/methanesulfonic acid stock solution (see example III) was weighed into a 100 mL polymerization vessel followed by addition of the 2% polyaniline/methanesulfonic acid solution (~10 g.). The resulting mixture (~2 wt %) was mechanically stirred under nitrogen for 24 hours under nitrogen to ensure complete mixing. Approximately 10 mL of the solution was transferred to a casting dish (45 mm. Diameter) and the acidic solvent was evaporated from the solution in a large sublimator as described in example 2. After 4 days, the petri dish was removed and methanol was added to detach the polymer film. Subsequently, it was washed with MeOH and then soaked in MeOH for 3 h. Finally, the cast film was dried on a coarse fritted filter funnel under a nitrogen flow. It was pressed down with a petri dish cover, on top of which was placed a steel weight so as to prevent the up-curling of the film upon drying. A series of such composite films was prepared as shown in Table I, below.

The remaining portions of the blend solutions were poured into methanol to precipitate the blends, each of which was collected and washed with methanol, and dried in vacuum for 48 hr. These precipitated blends were used in the thermal analysis experiments.

Conductivity of Polyaniline/PBZT composite films

D.C. conductivity measurement of the cast films were performed at room temperature with 4-probe technique. The thickness of the films were determined optically to be 15–50 microns.

TABLE I

| PANI/PBZT ratio | S/cm |
| --- | --- |
| 90/10 | 124 |
| 80/20 | 51 |
| 70/30 | 52.8 |
| 60/40 | 29 |
| 50/50 | 16.9 |
| 30/70 | 0.55 |
| 10/90 | 0.0013 |
| 5/95 | $8.7 \times 10^{-5}$ |
| 2/98 | $<10^{-10}$ |

Thermal Properties Polyaniline/PBZT composites

The thermal behaviors and thermoxidative stabilities of the precipitated PANI.MSA/PBZT blends were assessed by differential scanning calorimetry (DSC, $N_2$ with scan rate at 10° C./min) and thermogravimetric analysis (TGA, He or Air with scan rate at 10° C.). The results are summarized in the following table. DSC results suggested that some chemical events were taking place between ~200° C. to ~300° C. for all the blends except 10:90 PBZT.MSA/PBZT, as evidenced by one or two broad exotherms with peak temperatures as shown in Table II. We believe these observations correspond to similar chemical and physical phenomena previously reported for several polyaniline salts (HCl, $H_2SO_4$, HCOOH, $H_3PO_4$ and p-toluenesulfonic acid). Their thermal behaviors have been described in terms of a three-step process: (1) the loss of water molecules from PANI.ES takes place from room temperature up to 110° C.; (2) partial deprotonation and escape of the gaseous acid occurs between 110°–275° C.; (3) oxidative/thermal degradation of PANI.ES commences about 275° C. As indicated by the TGA results, the thermal and thermoxidative stabilities of the blends increased with an increase in the PBZT content.

TABLE II

Thermal Analysis Results for PANI.MSA/PBZT Blend.

| PANI/PBZT Ratio | $DSC^c$ in $N_2$ | TGA in AIR | | | TGA in HELIUM | | |
| --- | --- | --- | --- | --- | --- | --- | --- |
| | | $T_{Onset}$ | $T_{5\%}$ | $T_{10\%}$ | $T_{Onset}$ | $T_{5\%}$ | $T_{10\%}$ |
| $100:0^a$ | $75_{endo}$ $275_{exo}$ | 387 | 80 | 260 | 276 | 228 | 286 |
| $100:0^b$ | $81_{endo}$ | 225 | 77 | 246 | 267 | 215 | 254 |
| 90:10 | $57_{endo}$ $226_{exo}$ $292_{exo}$ | 398 | 133 | 376 | 356 | 278 | 354 |
| 70:30 | $98_{endo}$ $215_{exo}$ $288_{exo}$ | 407 | 291 | 434 | 309 | 299 | 362 |
| 50:50 | $65_{endo}$ $216_{exo}$ | 603 | 352 | 473 | 669 | 346 | 429 |
| 30:70 | $60_{endo}$ $231_{exo}$ | 675 | 437 | 611 | 669 | 423 | 672 |
| 10:90 | | 606 | 534 | 597 | 681 | 644 | 700 |
| 0:100 | | 680 | 580 | 640 | 668 | 473 | 682 |

Note:
[a] PANI.MSA with [η] = 2.30 dL/g;
[b] PANI.MSA with [η] = 0.32 dL/g;
[c] DSC endotherm values were their "valley" temperatures and exotherm, "peak" temperatures of the traces during initial scans. Immediate rescans resulted in disappearance of the endotherms and very broad baselines for the previously observed exotherms.

Various modifications may be made in the present invention without departing from the scope of the appended claims.

I claim:

1. A conductive composite composition consisting essentially of about 10 to 90 parts of the conducting form of polyaniline, balance an aromatic benzobisazole rigid-rod polymer.

2. The composite composition of claim 1 wherein said benzobisazole is a benzobisthiazole.

3. The composite composition of claim 2 wherein said benzobisthiazole is p-phenylene benzobisthiazole.

4. A process for making a conductive benzobisazole polymer film comprising the steps of (a) preparing a solution of about 0.1 to 5 weight percent benzobisazole polymer in methanesulfonic acid; (b) preparing a solution of about 0.1 to 5 weight percent of polyaniline in methanesulfonic acid; (c) adding the benzobisazole/methanesulfonic acid solution to the polyaniline/methanesulfonic acid solution; (d) forming a film from the solution resulting from step (c); (e) removing methanesulfonic acid from the thus-formed film; and (f) recovering the resulting film.

5. The process of claim 4 wherein said benzobisazole is a benzobisthiazole.

6. The composite composition of claim 5 wherein said benzobisthiazole is p-phenylene benzobisthiazole.

* * * * *